US008985779B2

(12) United States Patent
Masuda (10) Patent No.: US 8,985,779 B2
(45) Date of Patent: Mar. 24, 2015

(54) LED LIGHT SOURCE BOX AND PROJECTOR INCLUDING THE SAME

(75) Inventor: Naoki Masuda, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 301 days.

(21) Appl. No.: 13/576,919

(22) PCT Filed: Feb. 23, 2010

(86) PCT No.: PCT/JP2010/052740
§ 371 (c)(1),
(2), (4) Date: Aug. 2, 2012

(87) PCT Pub. No.: WO2011/104813
PCT Pub. Date: Sep. 1, 2011

(65) Prior Publication Data
US 2012/0300179 A1    Nov. 29, 2012

(51) Int. Cl.
*G03B 21/16* (2006.01)
*G03B 21/18* (2006.01)
*G03B 21/14* (2006.01)
(Continued)

(52) U.S. Cl.
CPC .............. *F21V 29/004* (2013.01); *F21V 15/01* (2013.01); *F21V 29/407* (2013.01); *F21V 31/00* (2013.01); *G03B 21/20* (2013.01); *F21V 19/003* (2013.01); *G03B 21/145* (2013.01); *G03B 21/16* (2013.01); *G03B 21/2033* (2013.01); *F21S 2/005* (2013.01); *F21Y 2101/02* (2013.01); *F21V 15/06* (2013.01); *F21V 19/0055* (2013.01)
USPC ............................. 353/52; 353/119; 362/373

(58) Field of Classification Search
CPC . G03B 21/16; G03B 21/2013; G03B 21/2033
USPC ........ 353/52, 119, 94; 362/373, 800; 313/512
See application file for complete search history.

(56) References Cited

U.S. PATENT DOCUMENTS

| 7,736,041 B2 | 6/2010 | Tronquet |
| 2008/0225537 A1 | 9/2008 | Tronquet |
| 2010/0171935 A1* | 7/2010 | Yamagishi et al. ............. 353/52 |

FOREIGN PATENT DOCUMENTS

| JP | 2001-346002 A | 12/2001 |
| JP | 2005-149943 A | 6/2005 |

(Continued)

OTHER PUBLICATIONS

International Search Report in PCT/JP2010/052740 dated Mar. 30, 2010 (English Translation Thereof).

*Primary Examiner* — William C Dowling
*Assistant Examiner* — Ryan Howard
(74) *Attorney, Agent, or Firm* — McGinn IP Law Group, PLLC (57) ABSTRACT

Provided is a LED light source box that includes: case (10) having body (11) and cover (13) to hermetically seal opening (12) of body (11); light source unit (15) having LED tight source (51) and holder (50) on which LED light source (51) is mounted; and cooling unit (61) having first cooling member (60) in contact with holder (50) and second cooling member (61) in contact with first cooling member (60). Holder (50) is fixed to cover (13) by fixing member (55) in a state where cooling unit (16) is sandwiched between holder (50) and cover (13). Heat insulation member (70) is disposed between holder (50) and fixing member (55), and air gap (91) is disposed between the outer peripheral surface of holder (50) and the inner peripheral surface of body (11).

11 Claims, 8 Drawing Sheets

(51) Int. Cl.
*G03B 21/22* (2006.01)
*B60Q 1/06* (2006.01)
*F21V 29/00* (2006.01)
*F21V 15/01* (2006.01)
*F21V 31/00* (2006.01)
*G03B 21/20* (2006.01)
*F21V 19/00* (2006.01)
*F21S 2/00* (2006.01)
*F21Y 101/02* (2006.01)
*F21V 15/06* (2006.01)

(56) References Cited

FOREIGN PATENT DOCUMENTS

| | | |
|---|---|---|
| JP | 2005-277877 A | 10/2005 |
| JP | 2005-300663 A | 10/2005 |
| JP | 2006-253274 A | 9/2006 |
| JP | 2007-096161 A | 4/2007 |
| JP | 2008-226843 A | 9/2008 |
| JP | 2009-069230 A | 4/2009 |

\* cited by examiner

LED LIGHT SOURCE BOX AND PROJECTOR INCLUDING THE SAME

TECHNICAL FIELD

The present invention relates to a light source box that uses a LED (Light Emitting Diode) as a light source.

BACKGROUND ART

The light source box that uses the LED as the light source (hereinafter, "LED light source box") is used, for example, as a light source for a projector. However, as in the case of other projector light sources (discharge lamps such as a metal halide lamp and an extra high pressure mercury lamp), high luminance must be achieved for the LED light source box. The amount of the light that the LED emits depends on the amount of current that is input. Accordingly, increasing the amount of light that is mitted by increasing the amount of current that is input can meet the demand of high luminance.

However, since the LED is low in quantum efficiency, most of electric energy input to the LED is converted into heat. Accordingly, when the amount of current that is input is increased, the amount of light that is emitted increases to lower light emission efficiency. Further, there is a possibility of thermal destruction of the LED. Therefore, to achieve a high-luminance LED light source box, means for effectively cooling the LED is essential.

Thus, Patent Literature 1 describes a light source device that includes a system to cool the LED by liquid and a projector that includes the light source device. The light source device described in Patent Literature 1 includes a box body constituting a part of a flow path through which the liquid circulates, and a mounting board housed in the box body. A LED element mounted on the mounting board is cooled by liquid passing through the flow path formed in the box body.

CITATION LIST

Patent Literature

Patent Literature 1: JP2005-300663A

SUMMARY OF INVENTION

Problems to be Solved by Invention

However, the cooling of the LED element or the hoard on which the LED element is mounted may cause dew condensation. For example, in the light source device described in Patent Literature 1, because of the thermal connection between the LED element and the box body, the temperature of the box body also decreases when the LED element is cooled. As a result, dew condensation may occur on the surface of the LED element.

Further, the LED element housed in a container or the board on which the LED element is mounted can be cooled by a cooling element attached to the LED element or the board. However, when the LED element housed in the container or the board on which the LED element is mounted is cooled, the temperature of the container also decreases. As a result, dew condensation may occur inside or outside the container.

Solution to Problems

A LED light source box according to the present invention includes a case, a light source unit, and a cooling unit. The case includes a body and a cover to hermetically seal the opening of the body. The light source unit includes a LED light source and a holder on which the LED light source is mounted. The cooling unit includes a first cooling member in contact with the holder of the light source unit, and a second cooling member in contact with the first cooling member. The holder of the light source unit is fixed to the cover by a fixing member in a state where the cooling unit is sandwiched between the holder and the cover of the case. A heat insulation member is disposed between the holder of the light source unit and the fixing member. An air gap is disposed between the outer peripheral surface of the holder of the light source unit and the inner peripheral surface of the body. In other words, the portion between the light source unit and the case cooled by the cooling unit is heat-insulated.

Effects of Invention

According to the present invention, dew condensation inside or outside the LED light source box is prevented.

DESCRIPTION OF EMBODIMENTS

Figure 1:
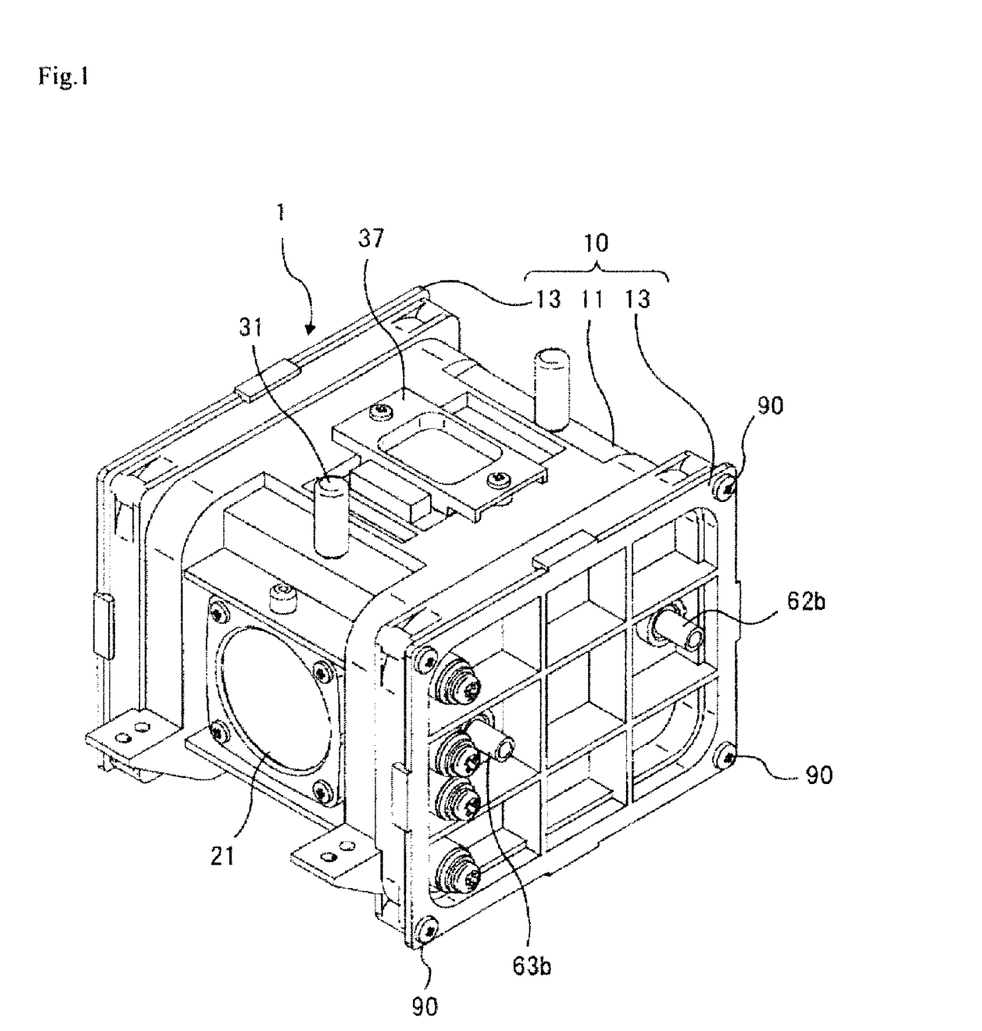
FIG. 1 is a perspective view showing a LED light source box according to the first exemplary embodiment of the present invention.
Figure 2:
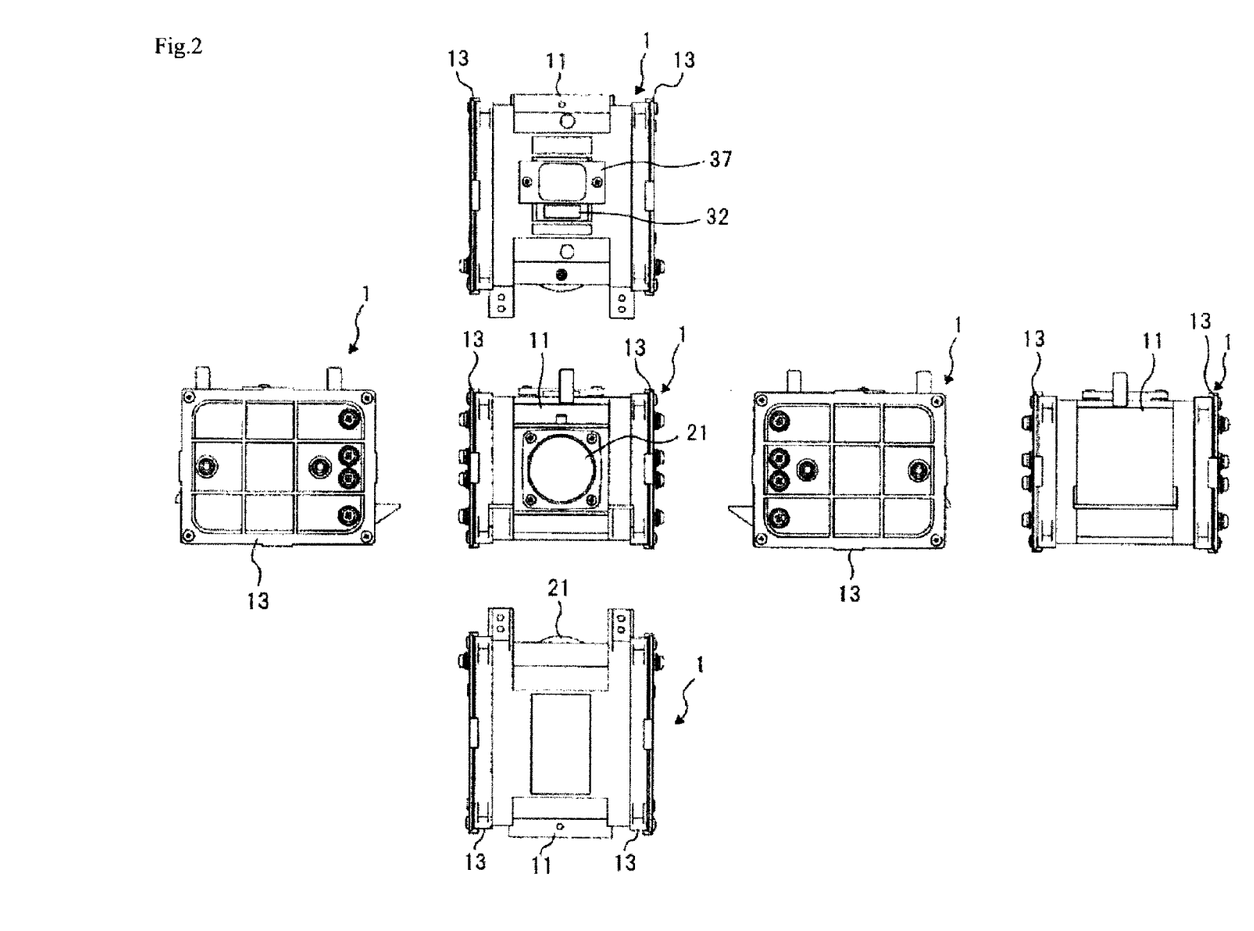
FIG. 2 is a plan view of the LED light source box shown in FIG. 1.

Hereinafter, a LED light source box according to the first exemplary embodiment of the present invention is described. As shown in FIGS. 1 and 2, LED light source box 1 according to this exemplary embodiment includes case 10 roughly formed into a rectangular parallelepiped shape. Components described below are housed to be integrated in case 10.

Figure 3:
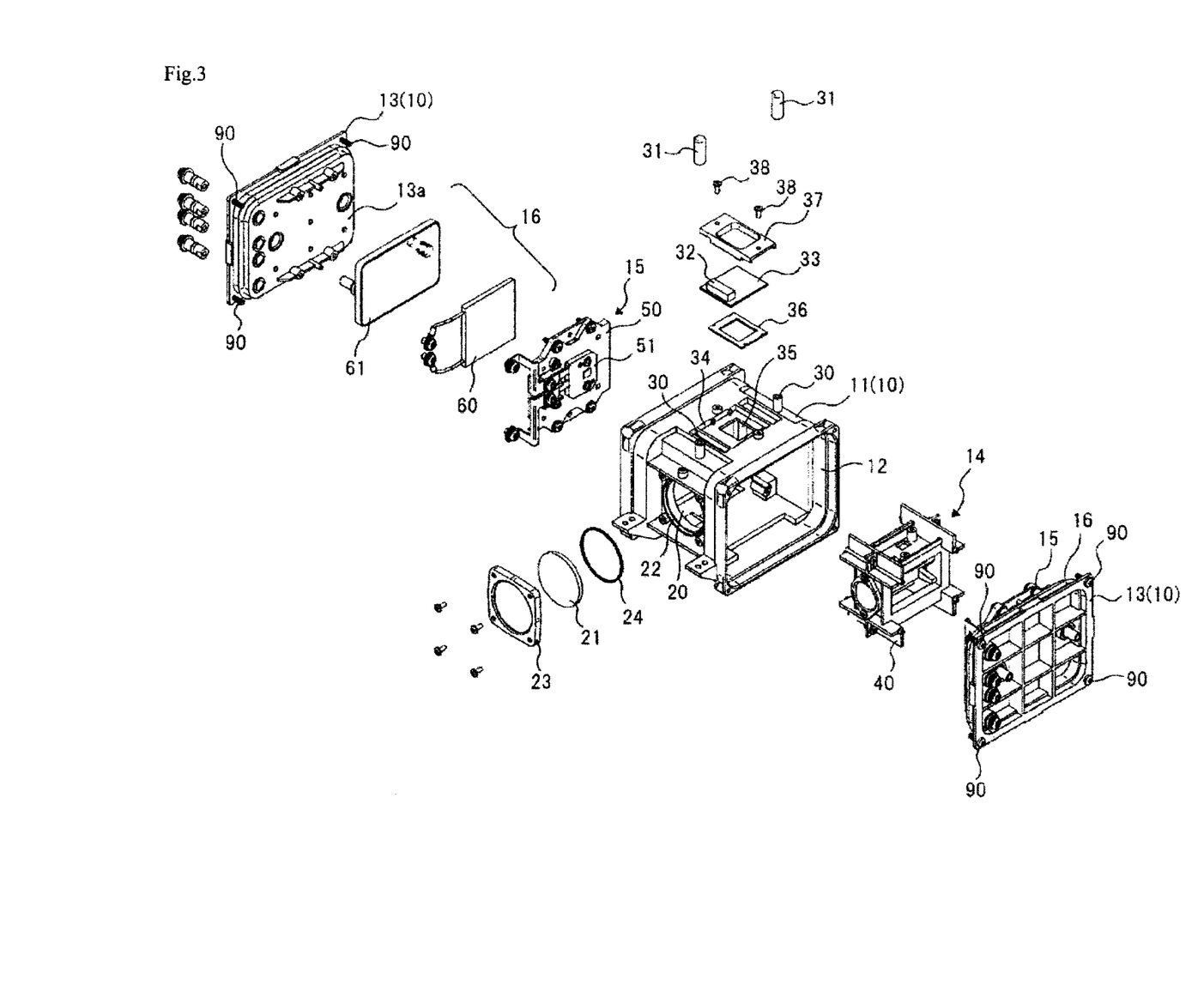
FIG. 3 is an exploded perspective view of the LED light source box shown in FIG. 1.

FIG. 3 is an exploded perspective view showing the structure of LED light source box 1. As shown in FIG. 3, case 10 includes body 11 having both sides opened, and a pair of side covers 13 that hermetically seal two opposing openings 12 of body 11. Rod lens unit 14, light source unit 15 and cooling unit 16 are housed in case 10. Rod lens unit 14, light source unit 15 and cooling unit 16 are described in detail below.

Mounting hole 20 is formed in the front of body 11, and condenser lens 21 is fixed to mounting hole 20. Specifically, the peripheral edge of the condenser lens 21 fitted in mounting hole 20 is mounted on reception part 22 that projects from the inner peripheral surface of mounting hole 20. The peripheral edge of condenser lens 21 mounted on reception part 22 is sandwiched between frame 23 fixed to the front of body 11 and reception part 22. Sealing member 24 is disposed between reception part 22 and the peripheral edge of condenser lens 21.

On the upper surface of body 11, two filling ports 30 are formed to fill case 10 with dry gas (e.g., nitrogen). Two filling ports 30 are sealed with caps 31. A board (connector board 33) having connector 32 to connect a temperature sensor (not shown) is mounted between two filling ports 30. Specifically, rectangular concave part 34 is formed in the upper surface center of body 11, and rectangular hole 35 that communicates with the inside of body 11 is formed in the center of concave part 34. Frame-shaped sealing member 36 is disposed in the bottom (around hole 35) of concave part 34, connector board 33 is stacked on sealing member 36, and fixing plate 37 is stacked on connector board 33. Fixing plate 37 is fixed to the upper surface of body 11 by screws 38. In other words, connector board 33 is sandwiched between the bottom surface of concave part 34 and fixing plate 37.

Rod lens unit 14 includes frame 40 arranged in parallel crosses, and a rod lens (not shown) supported by frame 40. Rod lens unit 14 is located in the center of case 10 (body 11), and fixed to case 11 by screws (not shown). Further, rod lens unit 14 is aligned so that the optical axes of the rod lens and condenser lens 21 can match each other.

Next, light source unit 15 and cooling unit 16 are described. As shown in FIG. 3, light source unit 15 and cooling unit 16 are mounted on left and right side covers 13. In other words, light source unit 15 and cooling unit 16 are arranged on both sides of rod lens unit 14. Lights output from left and right light source units 15 are synthesized by the rod lens to enter into condenser lens 21.

Left and right light source units 15 and cooling units 16 are substantially similar to each other in structure. The structure of light source unit 15 and cooling unit 16 shown on the left side of the surface of the paper in FIG. 3 is described in detail mainly by referring to FIG. 4.

Figure 4:
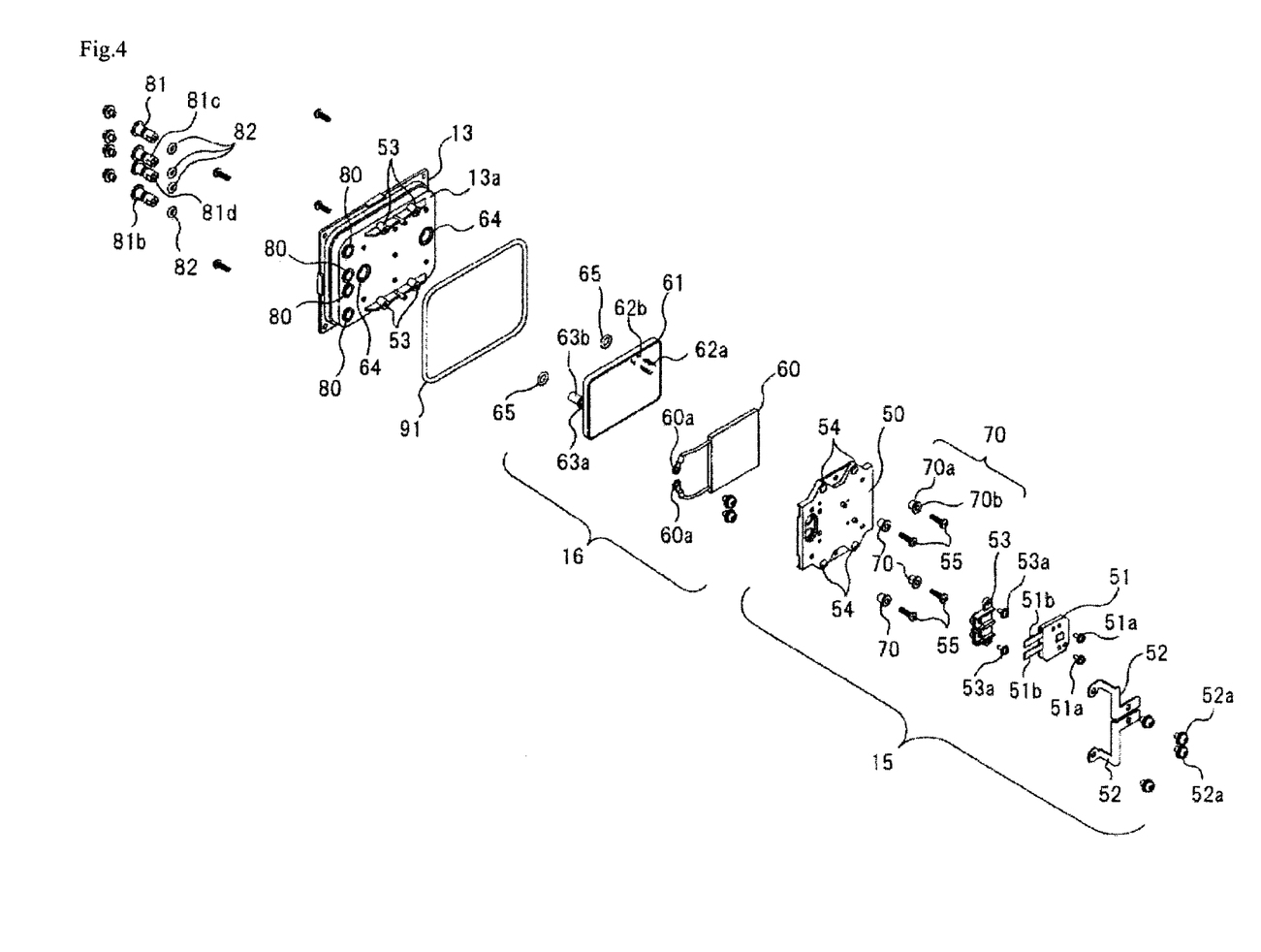
FIG. 4 is an exploded view of a light source unit and a cooling unit shown in FIG. 1.

Light source unit 15 includes holder 50, a LED light source (LED element 51) mounted on holder 50, and a pair of electrodes 52 mounted on holder 50. LED element 51 is fixed to the surface (mounting surface) of holder 50 by screws 51a. A pair of electrode leads 51b are drawn out from LED element 51. The end of electrode lead 51b is mounted on stage 53 fixed to holder 50 by screws 53a. One end of each electrode 52 is stacked on the end of electrode lead 51b mounted on stage 53, and fixed to stage 53 by screws 52a. In other words, electrode lead 51b and electrode 52, that abut each other (that are adjacent to each other) are to be electrically connected.

Cooling unit 16 includes first cooling member (Peltier element 60 in this exemplary embodiment), and a second cooling member (cold plate 61 in this exemplary embodiment). The surface of Peltier element 60 is bonded to the rear surface (surface opposite the mounting surface) of holder 50 of light source unit 15. Specifically, Peltier element 60 and holder 50 are thermally connected, and LED element 51 that is mounted on holder 50 is cooled by Peltier element 60.

Cold plate 61 is located between holder 50 on which Peltier element 60 is mounted and side cover 13, and the surface of cold plate 61 is bonded to the rear surface of Peltier element 60. In other words, cold plate 61 and Peltier element 60 are thermally connected. A flow path is formed in cold plate 61, and inlet 62a and outlet 63a that communicates with the flow path are formed in the rear surface of cold plate 61. Further, joints 62b and 63b are respectively formed to project in inlet 62a and outlet 63a. Joints 62b and 63b are exposed to the outside of case 10 via through-holes 64 formed in side cover 1 (refer to FIG. 1). O rings 65 are arranged between the outer peripheral surfaces of joints 62b and 63b and the inner peripheral surfaces of through-holes 64. The flow path (not shown) is connected to joints 62b and 63b exposed to the outside of case 10, and a refrigerant is supplied to cold plate 61. The refrigerant supplied to cold plate 61 cools Peltier element 60 by heat exchanging with Peltier element 60.

The flow of the refrigerant is further described in detail. As described above, in LED light source box 1, the two cooling units are arranged to face each other. For convenience of description, cold plate 61 shown on the left side of the surface of the paper in FIG. 3 and cold plate 61 shown on right side of the surface of the paper are distinctively referred to as "first cold plate" and "second cold plate". However, this distinction is for convenience of description. The refrigerant flows from the inlet of the first cold plate into the first cold plate. The refrigerant that flowed into the first cold plate passes through the flow path in the first cold plate to flow out from the outlet. The refrigerant that flowed out from the outlet of the first cold plate passes through the flow path (not shown) to reach the inlet of the second cold plate. The refrigerant that reached the inlet of the second cold plate flows from the inlet into the second cold plate. The refrigerant that flowed into the second cold plate passes through the flow path in the second cold plate to flow out from the outlet.

Further, a flow path design where the refrigerant flows from the second cold plate to the first cold plate can be employed. A flow path design where refrigerants are independently supplied to the first cold plate and the second cold plate can be employed. In the case of the flow path design where the refrigerants are independently supplied to the first cold plate and the second cold plate, the temperatures of the refrigerants supplied to the cold plates can be maintained roughly similar. In other words, two Peltier elements 60 (LED elements 51) can be cooled by the refrigerants that have roughly similar temperatures. In a case where a LED (e.g., red LED) sensitive to temperature changes is mounted, a flow path design where the refrigerants are independently supplied to the first cold plate and the second cold plate is suited.

In any case, LED element 51 is cooled by Peltier element 60, and Peltier element 60 is cooled by cold plate 61 (refrigerant). In other words, LED element 51 is directly cooled by Peltier element 60, and indirectly cooled by the refrigerant. Further, in other words, LED element 51 is doubly cooled by Peltier element 60 and the refrigerant.

Next, the fixing structure of light source unit 15 and cooling unit 16 are specifically described. As shown in FIG. 3, side cover 13 and light source unit 15 are fixed to each other sandwiching cooling unit 16 therebetween. In other words, cooling unit 16 is sandwiched between side cover 13 and light source unit 15. As shown in FIG. 4, in the inner surface of side cover 13, convex part 13a is formed to enter into opening 12 when side cover 13 is placed over opening 12 of body 11. Four screw bosses having screw holes 53 are formed in the surface of convex part 13a. On the other hand, four through-holes 54 are formed in the peripheral edge of holder 50 corresponding to four screw holes 54. Holder 50 is fixed to the inner surface of side cover 13 (surface of convex part 13a) by screws 55 inserted into through-holes 54. Reinforcing ribs are integrally formed around the screw bosses formed on the inner surface of the side cover 13.

Cylindrical heat insulating members 70 are inserted into four through-holes 54 fainted in the peripheral edge of holder 50, and screws 55 are inserted into heat insulating members 70. Heat insulating member 70 includes integrally formed cylindrical part 70a and flange part 70b. When screw 55 is inserted into heat insulating member 71, cylindrical part 70a is placed between the shaft of screw 55 and the inner peripheral surface of through-hole 54, and flange part 70b is placed between the head of screw 55 and the surroundings of through-hole 54. In other words, screw 55, which is thermally connected to side cover 13, is not thermally connected to holder 50. Accordingly, the heat of side cover 13 is not transmitted to holder 50 via screw 55. In other words, even when holder 50 (LED element 51) is cooled by cooling unit 16, dew condensation is prevented on the surface of case 10 without lowering the temperature of case 10.

Since cold plate 61 absorbs heat generated from Peltier element 60, its temperature becomes higher than room temperature. Further, the rear surface of cold plate 61 and the inner surface of side cover 13 are not bonded together, hence an air layer is formed between the rear surface of cold plate 61 and the inner surface of side cover 13. In other words, the low-temperature part of Peltier element 60 does not come into contact with case 10. Thus, even when holder 50 (LED element 51) is cooled by cooling unit 16, dew condensation is prevented from forming on the surface of case 10 without lowering the temperature of case 10.

Four terminal mounting holes 80 are formed on side cover 13. Terminals 81a to 81d are inserted into mounting holes 80. Terminals 81a and 81b are connected to electrodes 52 connected to electrode lead 51b of LED element 51. Terminals 81c and 81d are connected to electrodes 60a drawn from Peltier element 60. O rings 82 are arranged between the outer peripheral surfaces of terminals 81a, 81b, 81c, and 81d and the inner peripheral surfaces of mounting holes 80.

Next, the fixed structure of body 11 and side cover 13 are described. As shown in FIGS. 1 and 3, side cover 13 where light source unit 15 and cooling unit 16 are fixed is placed over opening 12 of body 11 to be fixed. Specifically, the four corners of side cover 13 are fixed around opening 12 of body 11 by screws 90. Before side cover 13 is fixed to body 11, light source unit 15 and cooling unit 16 are mounted to side cover 13. Before side cover 13 is fixed to body 11, rod lens unit 14 is disposed in body 11. Further, sealing member 91 (FIG. 4) is disposed between the opposing surfaces of side cover 13 and body 11.

Figure 5A:
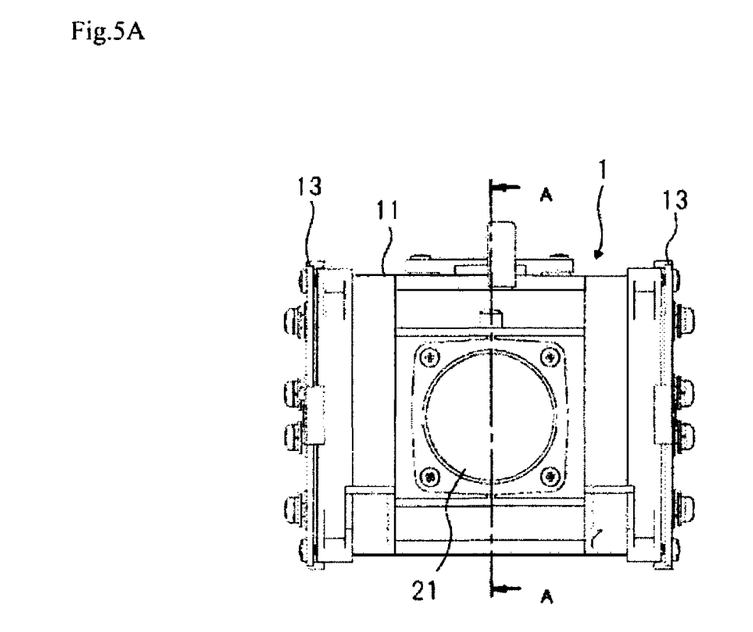
FIG. 5A is a front view of the LED light source box shown in FIG. 1.
Figure 5B:
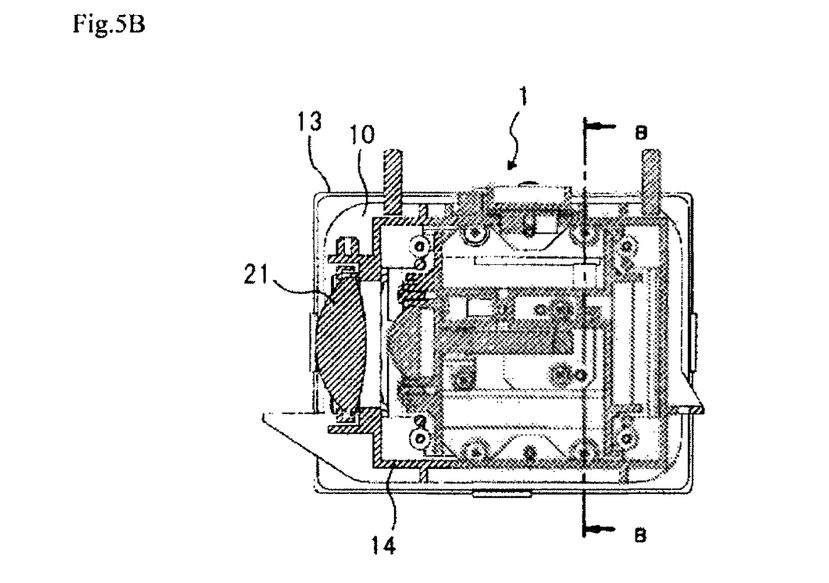
FIG. 5B is a sectional view cut along the line A-A of the LED light source box shown in FIG. 5A.
Figure 5C:
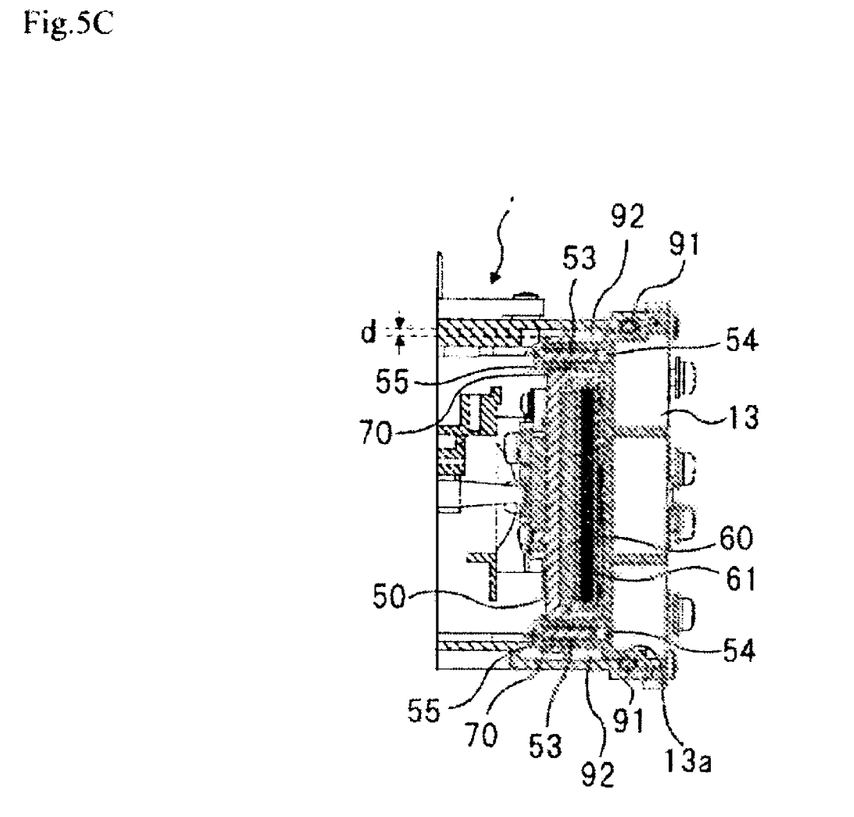
FIG. 5C is a sectional view cut along the line B-B of the LED light source box shown in FIG. 5B.

The description is made referring to FIGS. 5A to 5C. FIG. 5A is a front view of LED light source box 1. FIG. 5B is a sectional view cut along the line A-A shown in FIG. 5A. FIG. 5C is a sectional view cut along the B-B line shown in FIG. 5B.

As shown in FIG. 5C, when side cover 13 is placed over opening 12 of body 11, convex part 13a where light source unit 15 and cooling unit 16 are mounted fits inside opening 12. In this case, sealing member 91 fitted in the outer periphery of convex part 13a is placed between the outer peripheral surface of convex part 13a and the inner peripheral surface of opening 12.

The surface of convex part 13a on which light source unit 15 and cooling unit 16 are mounted is larger than light source unit 15 and cooling unit 16. Screw hole (screw boss) 53 into which screw 55 for fixing light source unit 15 (holder 50) is inserted is disposed closer to the inside than to the edge of convex part 13a. Accordingly, when convex part 13a is fitted inside opening 12, space (air layer) 92 is formed between the outer peripheral surface of light source unit 15 and cooling unit 16 and the inner peripheral surface of body 11. In other words, body 11 and light source unit 15 are not thermally connected. As a result, even when holder 50 (LED element 51) is cooled, the temperature of case 10 is not lowered, thus preventing the formation of dew condensation on the surface of case 10.

Further, as shown in FIG. 5C, the inner peripheral surface of opening 12 of body 11 is set lower by one stage to secure a sufficient height (d) of space 92. In other words, the inner peripheral surface of opening 12 of body 11 is partially recessed to be separated from the outer peripheral surface of light source unit 15. The height (d) of space 92 in this exemplary embodiment is 3.0 [mm].

Figure 6:
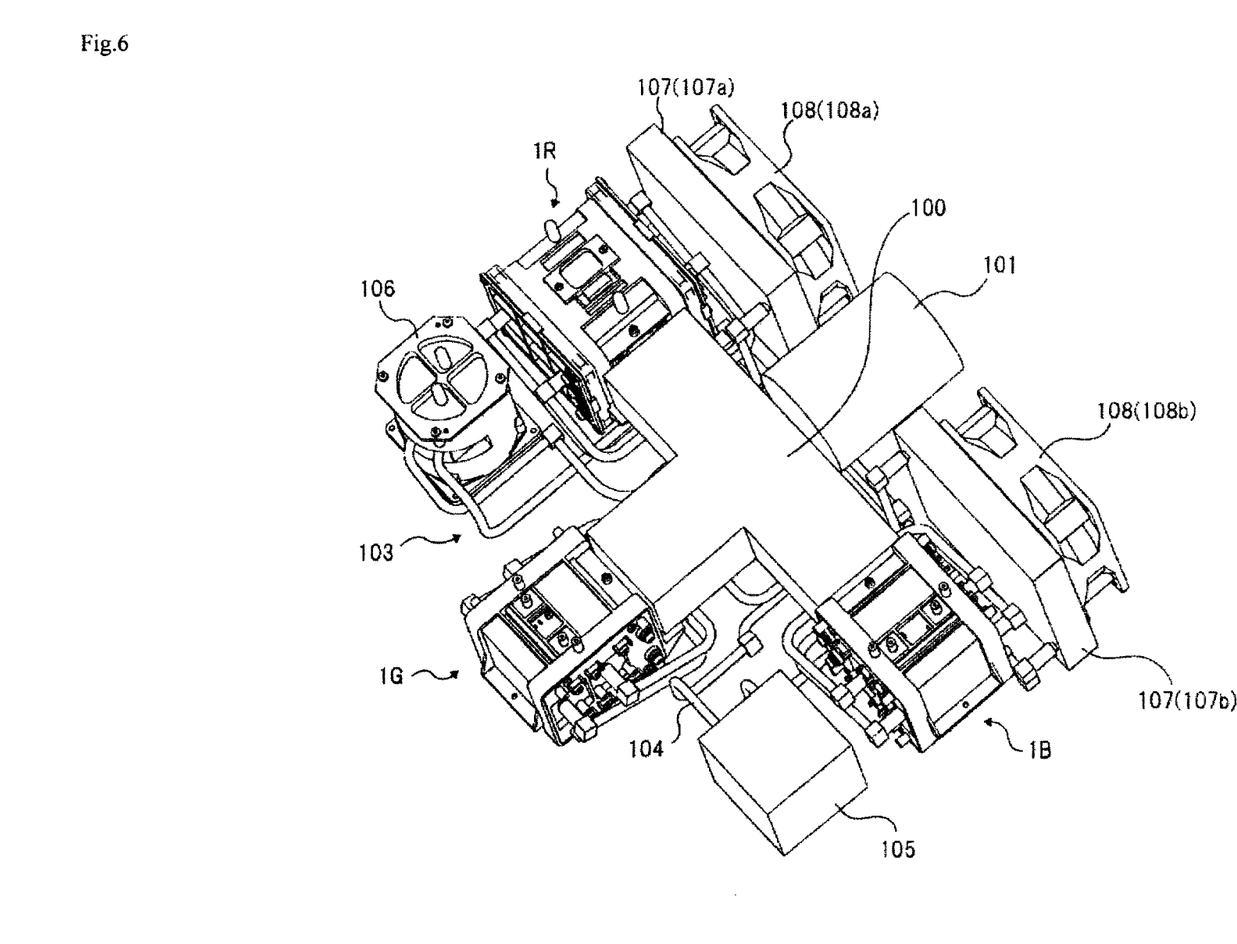
FIG. 6 is a perspective view showing an example of the internal structure of a projector that includes the LED light source box of the present invention.

FIG. 6 shows an example of the internal structure of a projector that includes the LED light source box of the present invention. This projector includes image forming unit 100, three LED light source boxes 1R, 1G, and 1B arranged around image forming unit 100, projection lens 101 that projects an image formed by image forming unit 100, and liquid cooling system 103.

LED light source box 1R includes two LED elements that emit red lights. LED light source box 1G includes two LED elements that emit green lights. LED light source box 1B includes one LED elements that emits blue light and one LED element that emits green light.

Image forming unit 100 includes at least across dichroic prism and three liquid crystal panels arranged around the prism. The three liquid crystal panels are prepared for the respective light source boxes. The liquid crystal panel modulates light output from each of LED light source boxes 1R, 1G, and 1B based on a video signal. The lights modulated by the respective liquid crystal panels are synthesized by the cross dichroic prism, and projected to a screen or the like via projection lens 101.

Liquid cooling system 103 includes flow path 104 via LED light source boxes 1R, 1G, and 1B. On flow path 104, there are arranged at least pump 105, reserve tank 106, radiator 107, and fan 108. In this exemplary embodiment, two radiators (first radiator 107a and second radiator 107b) and two fans (first fan 108a and second fan 108b) for supplying cooling air to radiators 107a and 107b are arranged. Flow path 104 includes a flexible tube.

Figure 7:
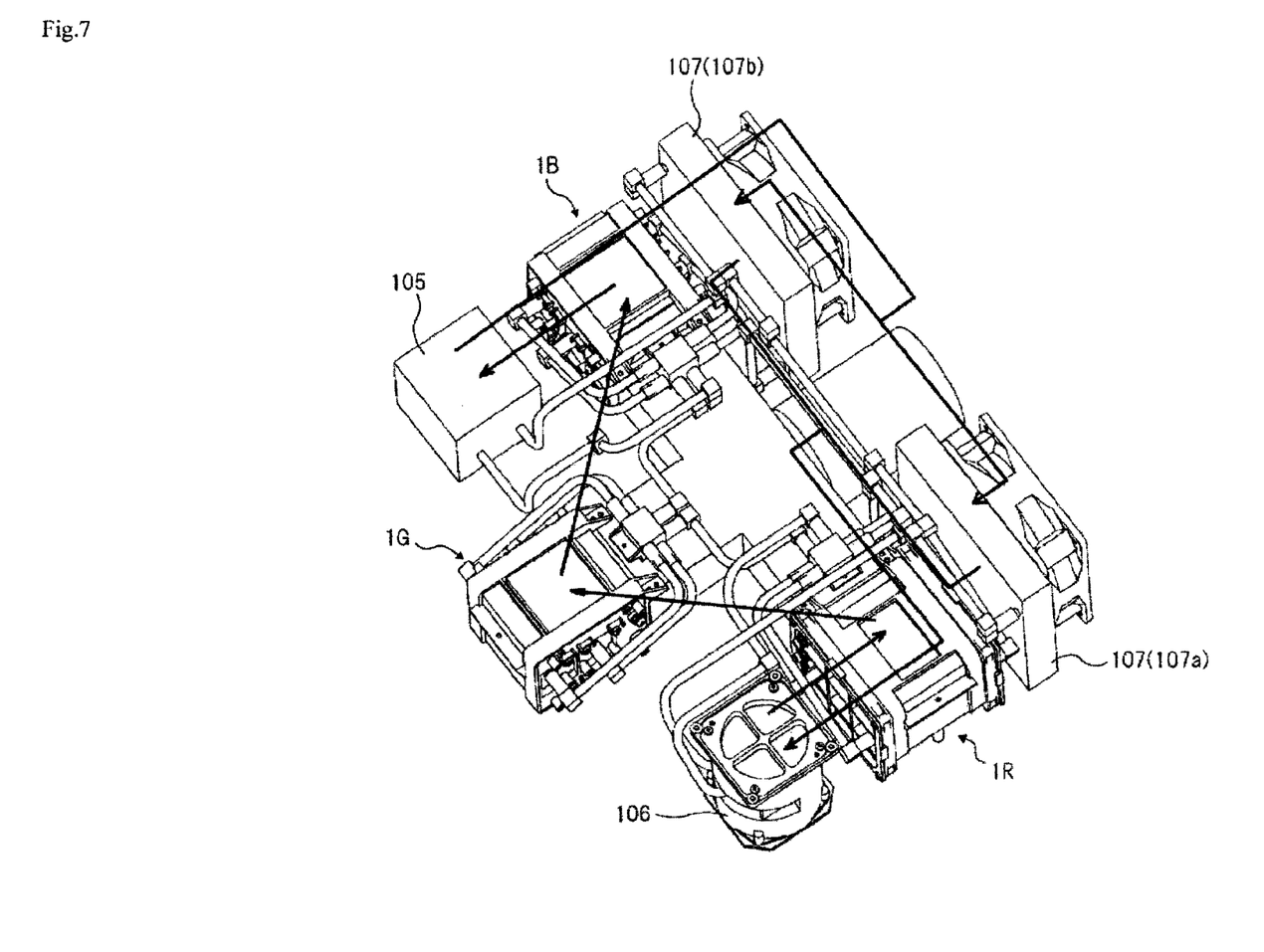
FIG. 7 is a perspective view showing the flow of a refrigerant in the projector shown in FIG. 6.

FIG. 7 schematically shows the flow of a refrigerant in liquid cooling system 103. The arrow shown in FIG. 7 indicates the flow of the refrigerant in liquid cooling system 103. However, the arrow shown in FIG. 7, which indicates the main flow of the refrigerant, does not completely match the real flow path design.

The refrigerant delivered from pump 105 is divided before it reaches radiator 107 so that it flows into first radiator 107a and second radiator 107b. The refrigerants that flowed into radiators 107a and 107b are cooled by heat exchanging. The refrigerants that flowed out of first radiator 107a and second radiator 107b are merged to flow into reserve tank 106. The refrigerant that flowed out of reserve tank 106 flows into LED light source box 1R to cool the LED element in light source box 1R. Then, the refrigerant returns to pump 105 via LED light source box 1G and LED light source box 1B. The refrigerant that flowed into LED light source box 1G and LED light source box 1B cools the LEDs in light source boxes 1G and 1B. Specifically, when pump 105 is a starting point, the refrigerant circulates in the order of pump 105⇒ radiator 107 ⇒ reserve tank 106⇒ LED light source box 1R⇒ LED light source box 1G⇒ LED light source box 1B⇒ pump 105. The temperature of the refrigerant, which is lowest immediately after it flows out from radiator 107, gradually increases during the passage through light source boxes 1R, 1G, and 1B.

The amount of heat generated by a red LED included in LED light source box 1R is smaller than that of a green LED and a blue LED included in other LED light source boxes 1G and 1B. However, the luminance change caused by the temperature change is larger in the red LED than that in the green LED and the blue LED. In other words, the luminance change caused by the temperature change is steeper in the red LED than that in the green LED and the blue LED. Thus, the temperature management of the red LED is most important.

The abovementioned flow path design is accordingly employed. In other words, the flow path design where the refrigerant cooled in radiator 107 is first supplied to LED light source box 1R is employed.

Furthermore, as described above, each of light source boxes 1R, 1G, and 1B includes a pair of LEDs. It is preferred that the temperature difference between the pair of LEDs be small. In particular, it is preferred that the temperature difference between the pair of red LEDs included in LED light source box 1R be kept at zero for long as possible. Therefore, different flow path designs are employed between LED light source box 1R and other LED light source boxes 1G and 1B. Specifically, parallel flow paths are arranged in LED light source box 1R, while a serial flow path is arranged in LED light source boxes 1G and 1B. More specifically, the refrigerant that flowed into the first cold plate in LED light source boxes 1G and 1B passes through the first cold plate to flow into the second cold plate. On the other hand, the refrigerants are independently supplied to the first cold plate and the second cold plate in LED light source box 1R.

REFERENCE NUMERALS

1 Led light source box
10 Case
11 Body
12 Opening
13 Cover
14 Rod lens unit
15 Light source unit
16 Cooling unit
60 Peltier element
61 Cold plate
53 Screw hole
54 Through-hole
55 Screw
70 Heat insulation member

The invention claimed is:

1. A LED light source box comprising:
   a case including a body and a cover to hermetically seal an opening of the body;
   a light source unit including a LED light source and a holder on which the LED light source is mounted;
   a cooling unit including a first cooling member in contact with the holder of the light source unit, and a second cooling member in contact with the first cooling member, wherein the holder is fixed to the cover by a fixing member in a state where the cooling unit is sandwiched between the holder and the cover;
   a heat insulation member disposed between the holder and the fixing member; and
   a gap between an outer peripheral surface of the holder and an inner peripheral surface of the body,
   wherein the fixing member comprises a screw inserted into a screw hole formed in the cover through a hole bored in the holder; and the heat insulation member has a cylindrical part located between a shaft of the screw and an inner peripheral surface of the hole, and a flange part located between a head of the screw and the surroundings of the hole.

2. The LED light source box according to claim 1, wherein the screw hole is disposed in a screw boss formed to project in an inner surface of the cover, and a reinforcing rib is integrally formed around the screw boss.

3. The LED light source box according to claim 1, wherein the inner peripheral surface of the body opposite the outer peripheral surface of the holder is recessed to be separated from the outer peripheral surface of the holder.

4. The LED light source box according to claim 1, wherein:
   the first cooling member comprises a Peltier element; and
   the second cooling member comprises a plate member in which a refrigerant flow path is formed.

5. A projector comprising the LED light source box specified in claim 1.

6. A LED light source box comprising:
   a case including a body and a pair of covers to hermetically seal two opposing openings of the body;
   a pair of light source units each including a LED light source and a holder on which the LED light source is mounted;
   a pair of cooling units each including a first cooling member in contact with the holder of the light source unit, and a second cooling member in contact with the first cooling member, wherein the holder of the first light source unit is fixed to the first cover by a fixing member in a state where the first cooling unit is sandwiched between the holder and the first cover, the holder of the second light source unit is fixed to the second cover by the fixing member in a state where the second cooling unit is sandwiched between the holder and the second cover;
   a heat insulation member disposed between the holder of each light source unit and the fixing member; and
   a gap between an outer peripheral surface of the holder of each light source unit and an inner peripheral surface of the body.

7. The LED light source box according to claim 6, further comprising an optical element that synthesizes light emitted from the first light source unit and light emitted from the second light source unit.

8. The LED light source box according to claim 6, wherein:
   the fixing member comprises a screw inserted into a screw hole formed in the cover through a hole bored in the holder; and
   the heat insulation member has a cylindrical part located between a shaft of the screw and an inner peripheral surface of the hole, and a flange part located between a head of the screw and the surroundings of the hole.

9. The LED light source box according to claim 6, wherein the inner peripheral surface of the body opposite the outer peripheral surface of the holder is recessed to be separated from the outer peripheral surface of the holder.

10. The LED light source box according to claim 6, wherein:
    the first cooling member comprises a Peltier element; and
    the second cooling member comprises a plate member in which a refrigerant flow path is formed.

11. A projector comprising the LED light source box specified in claim 6.

* * * * *